Feb. 19, 1974 C. V. GOEBEL, JR 3,793,235
RECLAMATION OF POLYFLUOROHALOCARBONS
Filed April 3, 1972
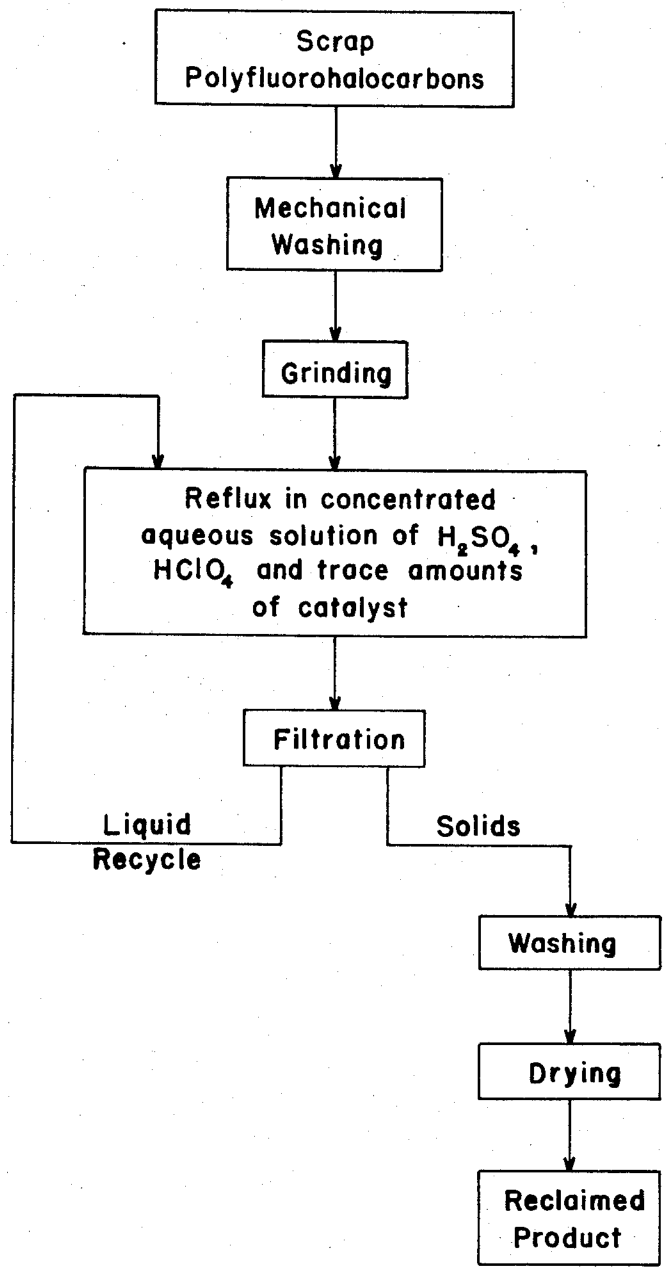

United States Patent Office 3,793,235

Patented Feb. 19, 1974

3,793,235

RECLAMATION OF POLYFLUOROHALOCARBONS

Charles V. Goebel, Jr., Wyomissing, Pa., assignor to The Polymer Corporation, Reading, Pa.

Filed Apr. 3, 1972, Ser. No. 240,392
Int. Cl. C08f 3/24, 47/24, 3/26
U.S. Cl. 260—2.3 8 Claims

ABSTRACT OF THE DISCLOSURE

Scrap and off-grade polyfluorohalocarbons are reclaimed for further use by chemically oxidizing the impurities contained therein in a mixture of concentrated sulphuric and perchloric acids and a catalyst. The process includes the steps of reducing the materials to a fine power by cryogenic grinding, heating the powder in the acid mixture, separating and washing the purified powder, and recycling the acid mixture.

BACKGROUND OF THE INVENTION

Field of the invention

This invention relates to a process for the commercial reclamation of scrap and off-grade polyfluorohalocarbons.

Description of the prior art

The high chemical and thermal stability of polyfluorohalocarbons, such as, for example, polytetrafluoroethylene and polymonochlorotrifluoroethylene, makes is practical to reclaim scrap polyfluorohalocarbons for further use. The scrap polyfluorohalocarbons are available in the form of grindings, turnings and various debris, and, when freed from impurities, may be recycled for further processing, either in their entirety or when mixed with virgin material. Not only does this recycling contribute to the ecology by utilizing waste materials that otherwise can be disposed of essentially only by destructive degradation that is accompanied with the evolution of noxious and corrosive halogen-containing gases, but also the recycling for further use can be a matter of economic significance due to the relatively high cost of virgin materials.

In reclaiming scrap polyfluorohalocarbons, it is necessary to comminute it into a processable size range and to remove any impurities that are present in the scrap, such as pigments, dyes, oil and miscellaneous dirt. If the impurities are not effectively removed, various of the physical properties of articles made from the reclaimed materials, such as elongation, tensile strength, flex strength, flexural modulus and impact strength, will be adversely affected. Also, since polyfluorohalocarbons are generally processed at high temperatures, the presence of impurities may cause considerable discoloration.

Several methods are known to the prior art for removing impurities from scrap and off-grade polyfluorohalocarbons. Essentially, these rely upon size reduction by room temperature microgrinding and removal of the impurities by means of oxidation.

In one of these processes, the scrap material is heated to above the melting temperature of the polymer. For example, in the case of polytetrafluoroethylene which has a first order transition temperature at about 710° F., the scrap material should be heated in a range of from about 900° to 1100° F. At these temperatures, the polymer is thermally degraded, resulting in a considerable loss in molecular weight and the evolution of noxious and corrosive halogen-containing gaseous by-products as well as the recoverable monomer. Due to the degradation of the fluorohalocarbons in this process, it is necessary to purify the degraded monomeric products in order that the desired monomer may be repolymerized and reconstituted into a commercially useful resin.

Another example of a prior art process is the chemical oxidation of impurities in scrap materials by utilization of conventional strong chemical oxidizing agents such as aqua regia, fuming nitric acid and the like. These oxidizing agents are not always completely effective and may introduce impurities of their own into the system, e.g., nitrates in the form of esters of cellulose.

In yet another prior art process, the scrap material is exposed to a gaseous perchloric acid at elevated temperatures by distributing the scrap in a thin layer over the bottom of an evaporating dish, covering the layer with a concentrated perchloric acid solution, heating the solution (as by infrared) and evaporating the perchloric acid to cause it to percolate through the bed of scrap material. This process, while operative, is comparatively slow, is very hazardous (explosive), has high power requirements, has poor economics, and discharges active perchloric acid to the atmosphere.

In the processes that utilize chemical oxidation, it is necessary at some point in the process to comminute the polyfluorohalocarbons to a processable size range having regard both to the oxidation reaction and any later shape formation operations. Conveniently, the scrap material can be reduced at the beginning of treatment to a size that is small enough to expose sufficient surface area for the oxidation reaction and also suitable to permit handling of the reclaimed material in conventional shape forming processes, Quite generally, these requirements are met if the scrap is ground to about 40-mesh and below. Surprisingly, and contrary to the teachings of the prior art, polyfluorohalocarbons can be ground to this particle size with ease using cryogenic grinding procedures. This contrasts most favorably with the room temperature microgrinding techniques known to the prior art that achieve size reduction only by laborious and uneconomical treatment of the polyfluorohalocarbons.

SUMMARY OF THE INVENTION

Accordingly, it is an object of this invention to provide a process for the reclamation of scrap and off-grade polyfluorohalocarbons.

Another object of this invention is to provide an improved process for the reclamation of polyfluorohalocarbons that does not degrade the polyfluorohalocarbons.

Another object of this invention is to provide an efficient and economical method for reducing the particle size of polyfluorohalocarbons to a range that is useful in processing the polyfluorohalocarbons.

Another object of this invention is to provide a process for the reclamation of polyfluorohalocarbons that is free from corrosive and noxious by-products.

Briefly, these and other objects of this invention are achieved by oxidizing the impurities in the scrap polyfluorohalocarbons in an aqueous mixture of concentrated sulfuric and perchloric acids at elevated temperatures. To achieve greater chemical efficiency, the scrap material should first be reduced to powdered form and trace amounts of a catalyst, such as ammonium, alkali metal and alkaline earth salts of an oxy-derivative of Group V metals such as vanadate, arsenate and antimonate, should be included in the acid solution. After the impurities have been fully oxidized, the purified polyfluorohalocarbons are filtered, dried and washed, and the filtrate, comprised of the concentrated acids and catalyst, is held for future use in the system.

DESCRIPTION OF THE DRAWING

The figure is a schematic flow sheet illustrating a preferred method of practicing this invention. Scrap polyfluorohalocarbons, such as grindings, turnings and miscellaneous pieces, are first mechanically washed with a soap solution and then with organic solvents. The washed scrap material is then ground into powder form, such as 40-mesh (U.S. Standard) or smaller, preferably by first effecting a rough size reduction as in a Cumberland mill, and then by reducing the scrap to powdered form as by means of cryogenic grinding. This final grinding can be performed utilizing a counter-rotating pin mill while the scrap material is contacted with liquid nitrogen.

The powdered scrap is introduced into a reactor along with a mixture of concentrated sulphuric acid (96+% by weight sulphuric acid), a concentrated aqueous solution of perchloric acid (about 70% by weight perchloric acid), and trace amounts of a catalyst. The exact ratio of sulphuric acid to perchloric acid does not appear to be critical; however, there should be 20 to 80% by volume sulphuric acid and 80 to 20% by volume perchloric acid. More than 80% by volume perchloric acid is not desirable due to the fact that it is too dangerous to deal with this strong oxidizing agent in higher percentages, and further, in that at least 20% by volume sulphuric acid is required in order to obtain the desired effective oxidation.

The oxidizing acids are then heated to reaction temperatures, preferably atmospheric reflux temperatures, and the scrap is stirred vigorously. Depending upon the impurities present, the mixture is heated for a period of about two to six hours while vigorous stirring continues. A visual end point of the reaction can be noted when certain catalysts, such as ammonium vanadate, are used. When ammonium vanadate is initially added, it imparts a yellow or orange color to the solution. However, when the oxidation begins, the ammonium vanadate assumes its catalytically active state and, while therein, causes the liquid to turn green. When the oxidation is complete, the ammonium vanadate returns to its original state and the yellow to orange color is restored. Thus, in this instance, there is no difficulty in recognizing when the impurities have been oxidized and the refluxing can be discontinued.

The mixture is poured out of the reflux and filtered, such as with sintered glass filter discs, and the accumulated solids represent the purified polyfluorohalocarbons. These solids may be washed in one or more stages, at least one of which should be accomplished in boiling water. After the final filtration, the solids are dried and the recovered product will approximate the whiteness of virgin material.

The filtrate from the initial filtration step contains essentially only a concentrated solution of sulphuric and perchloric acids along with the catalyst. This solution may be recycled, along with any necessary make-up acid, to oxidize further quantities of scrap polyfluorohalocarbon powders.

EXAMPLE

A quantity of scrap polytetrafluoroethylene, including grindings, turnings, floor sweepings, and various bits and pieces, and containing various impurities such as blue dye, oil and miscellaneous debris, was washed in a soap solution and then further washed with an organic solvent (Triclean). After the washing stages, the scrap was given a rough size reduction to a uniform (pellet) size in a Cumberland mill to prepare for final grinding to the particle size and distribution desired.

The roughly sized particles (ca. 1/8" diameter) were placed in a hopper attached to a counter-rotating pin mill which had been fitted for the introduction of liquid nitrogen into both the hopper and the pin grinding area. By regulating the detailed pin configuration, nitrogen flow and feed rate, the desired through-put and particle size distribution is obtained.

For example, with all pins at narrow clearance tolerance, medium nitrogen flow and 1100–2500 r.p.m. in the counter-rotating heads, 236 pounds per hour of finished fine polyfluorohalocarbon was obtained which passed the internal 40-mesh screen. This particle distribution was considered suitable for later processing into molded half-inch rod.

1.0 kilogram of the ground powder was placed in a 2-liter glass reactor which included a stirring device and a thermometer. To this powder was added 900 milliliters of a solution consisting of 450 milliliters of 96+ percent sulphuric acid and 450 milliliters of a 70 to 72% concentrated aqueous perchloric acid solution and .45 grams of ammonium vanadate. The reactor was heated to the boiling point of the solution, which was 210° C., and the scrap material was refluxed and vigorously stirred for a period of six hours. When the acid and catalyst solution was first introduced into the reflux, it was light orange in color, but when the refluxing began, it had turned to a light green color. At the end of the six-hour reflux period, the solution reverted to its original light orange color.

The solids were separated from the acid solution by filtration, using a sintered glass filter disc. The recovered solids were then washed by vigorous stirring in boiling water, the water was decanted, and the solids were dried. The dried solids had a pure white color similar to virgin polytetrafluoroethylene.

A half-inch rod was made from the purified product by conventional compression molding-type extrusion.

After the rod was extruded, it was examined and found that no significant discoloration had taken place. Various mechanical properties were measured, such as elongation and tensile strength, and they were found to be clearly superior to the properties of rods similarly extruded from conventionally reclaimed polytetrafluoroethylene. For example, the specimen here prepared had an elongation of 200% and a tensile strength of 1800 p.s.i., which properties compare favorably with an elongation of about 120% (±20%) and a tensile strength of about 1700 p.s.i., which are typical of the properties obtained using polytetrafluoroethylene reclaimed by prior art chemical oxidation techniques.

I claim:

1. A method for the reclamation of polyfluorohalocarbons from the group consisting of polytetrafluoroethylene and polymonochlorotrifluoroethylene which comprises treating the polyfluorohalocarbons with an aqueous mixture of 20% to 80% by volume concentrated sulphuric and 80% to 20% by volume concentrated perchloric acids at elevated temperatures approximating the boiling point of the aqueous mixture.

2. A method according to claim 1 in which trace amounts of a catalyst are included in the solution.

3. A method according to claim 2 in which the catalyst is an ammonium, alkali metal or alkaline earth salt of an oxy-derivative of vanadium, arsenic or antimony.

4. A method according to claim 3 in which the catalyst is ammonium vanadate.

5. A method according to claim 1 in which the concentrated sulphuric acid is at least about 96% by weight sulphuric acid.

6. A method according to claim 1 in which the concentrated aqueous perchloric acid is at least about 70% by weight perchloric acid.

7. A method according to claim 1 including the step of comminuting the polyfluorohalocarbons by cryogenic grinding prior to their treatment in the aqueous mixture.

8. A method according to claim 1 wherein the elevated temperatures are atmospheric reflux temperatures.

References Cited

UNITED STATES PATENTS

| | | | |
|---|---|---|---|
| 3,115,486 | 12/1963 | Weisenberger | 260—92.1 S |
| 3,527,857 | 9/1970 | Fitz | 260—92.1 S |
| 3,690,569 | 9/1972 | Leverett | 260—92.1 S |
| 2,751,375 | 6/1956 | Mantell et al. | 260—92.1 S |
| 2,543,530 | 2/1951 | Kropa et al. | 260—2.3 |

HARRY WONG, Jr., Primary Examiner

U.S. Cl. X.R.

260—92.1 S